US005571258A

United States Patent [19]

Pearson

[11] Patent Number: 5,571,258

[45] Date of Patent: Nov. 5, 1996

[54] SEMI-AUTOMATED MEDICATION DISPENSER

[76] Inventor: Walter G. Pearson, P.O. Box 4371, Pineville, La. 71361-4371

[21] Appl. No.: 502,118

[22] Filed: Jul. 13, 1995

[51] Int. Cl.[6] ........ B23Q 7/04

[52] U.S. Cl. ........ 221/211; 294/64.3

[58] Field of Search ........ 221/211, 131, 221/194, 195, 289, 278, 126, 127; 294/64.1, 64.3

[56] References Cited

U.S. PATENT DOCUMENTS 3,986,638 10/1976 DeHart ........ 221/211
4,561,687 12/1985 Bostrom ........ 221/211

*Primary Examiner*—Kenneth Noland
*Attorney, Agent, or Firm*—John H. Runnels; Warner J. Delaune

[57] ABSTRACT

A suction tube for use with a medication dispensing system is provided, comprising a handle which houses a suction motor powered by an external power source; a stationary tube attached to and extending from the handle in fluid communication with the suction motor; a screen to prevent the passage of pills into the suction motor; a second tube slidably attached to the stationary tube, the second tube having a distal end; a pill obstructor on the second tube for preventing a retrieved pill from traveling through the second tube; collection cup retainer attached to the handle for holding a collection cup; a pill guide positioned adjacent to the collection cup retainer for guiding the retrieved pill to the collection cup; and a sensor located within the pill guide for detecting the passage of the retrieved pill through the suction tube. Preferably, the suction tube includes an adjustable pill exit aperture which can also be used to adjust the suction strength through the suction tube. Optionally, the suction tube may also include an attachment which allows for adjustment of the pill inlet as well.

11 Claims, 9 Drawing Sheets

SEMI-AUTOMATED MEDICATION DISPENSER

BACKGROUND OF THE INVENTION

I. Field of the Invention

This invention pertains to semi-automated medication dispensers, particularly to medication dispensers suitable for dispensing multiple medications to multiple patients with minimal risk of error, pilferage, and contact with the medications.

II. Description of the Prior Art

Hospitals, clinics, nursing homes, and the like typically must dispense multiple medications to multiple patients on ever-changing schedules. Insuring that the right patient receives the right amount of the right medication at the right time presents significant logistical problems to the personnel responsible for prescribing, dispensing, and administering the medications. Even when everything in the system works properly, the logistics and paperwork required to dispense all medications to a group of patients correctly can be very time-consuming, labor-intensive, and expensive.

Unfortunately, it is not uncommon for medications to be administered to the wrong patient, or to the right patient in the wrong amount or at the wrong time. Such mistakes can arise in many ways. A patient may be misidentified, or moved to a different bed. Busy nurses may neglect to cross-check patient identification numbers in all cases. The cups containing different patients' medications may inadvertently be switched. The potentially harmful consequences of incorrectly dispensing medications to patients requires no elaboration.

Compounding these already-difficult logistical problems is the fact that a clandestine demand exists for many prescription drugs, requiring that appropriate security measures be taken to minimize the risk of theft.

In addition to the foregoing difficulties, it is essential that patients receive their medication without contamination from other sources. This is especially so in the case of patients who have hypersensitive reactions to certain chemicals. The primary sources of contamination are most often from the handling of the medication by the health care provider or the patient. For example, if the attending nurse has handled a previous medication for another patient, trace amounts of that drug may contaminate the medication for the next patient if also touched by the nurse. However, the medication administration systems used by most medical institutions do not ensure that the medication remains untouched before being consumed by the patient.

U.S. Pat. No. 3,848,112 discloses magnetically coded identification tags for correlating the identity of a patient to the patient's prescriptions, samples, and the like.

U.S. Pat. No. 4,695,954 discloses a medication dispensing system for use with a single patient, in which all medications to be dispensed at a particular time for that patient are manually loaded into a particular compartment of the device, and the device allows access to each compartment at the appropriate time.

U.S. Pat. No. 4,971,221 discloses a drug dispenser with a monitor such as an optical sensor to detect when a dose of the drug has been dispensed.

U.S. Pat. No. 4,967,928 discloses a medication cart with an on-board computer system in which unsecured medications are stored in conventional cabinet cubicles; and in which secured narcotics are either stored in a single-dose, automatic dispenser apparatus requiring special packaging for dispensing doses of the narcotics, or are stored in a locked conventional cubical.

U.S. Pat. No. 3,917,045 discloses an automatic drug dispensing apparatus which dispenses drugs from cartridges, each of which holds a plurality of individual drug dosages.

U.S. Pat. No. 4,847,764 discloses a system for dispensing medications in a health care institution in which a central computer system controls a plurality of remote medication dispensers.

Other patents cited during the prosecution of my copending application Ser. No. 08/206,877 include the following: U.S. Pat. Nos. 2,684,783; 3,334,784; 3,467,277; 3,892,489; 4,018,358; 4,141,461; 4,267,942; 4,546,901; 4,473,884; 4,655,026; 4,664,289; 4,674,651; 4,674,652; 4,733,362; 4,785,969; 4,832,229; 4,853,521; 4,911,327; and 4,939,705.

There is a continuing, untilled need for a multi-patient, multi-medication, semi-automated medication dispenser that can correctly dispense the correct medications to the correct patients at the correct times in the correct dosages, in any sequence of patients that is convenient, in a manner that is cost-efficient, that reduces the amount of human labor required, that minimizes the risk of error, that does not require any special packaging for pills dispensed, that is resistant to pilferage, and that eliminates the need to touch the medication.

A novel, semi-automated medication dispenser has been invented that greatly simplifies the logistics of correctly dispensing multiple medications to multiple patients in the correct dosages at the correct times, in a manner that is cost-efficient and labor-efficient, that greatly reduces the probability of errors, and that inhibits pilferage. The novel dispenser can be loaded with many days' worth of medication (e.g., 30 days) at one time, and requires no special packaging for the medications.

The novel dispenser is controlled by a computer. Patient information and physician orders are entered into the computer's memory. Medications needed by all the patients in a ward are loaded into individual compartments, for example by a pharmacist. Many days' worth of medication may often be loaded at once.

After the medications are loaded into the dispenser, access to the individual compartments is controlled by the computer. When a proper password is entered—for example by the dispensing nurse—followed by identifying information for a particular patient, the computer allows access to only those compartments containing medications that are appropriate for the individual patient at that time. A variety of suction tubes may be employed to physically retrieve the desired medication. In many cases, the computer controls the dosage of the medication being dispensed as well, by controlling the number of pills dispensed. Thus, each patient receives all appropriate medications, and only the appropriate medications. The computer also simultaneously makes a record of the medications administered to each patient. In the entire process, human hands need never touch the tablets or capsules being dispensed to the patient.

DESCRIPTION OF THE PREFERRED EMBODIMENTS

Figure 1B:
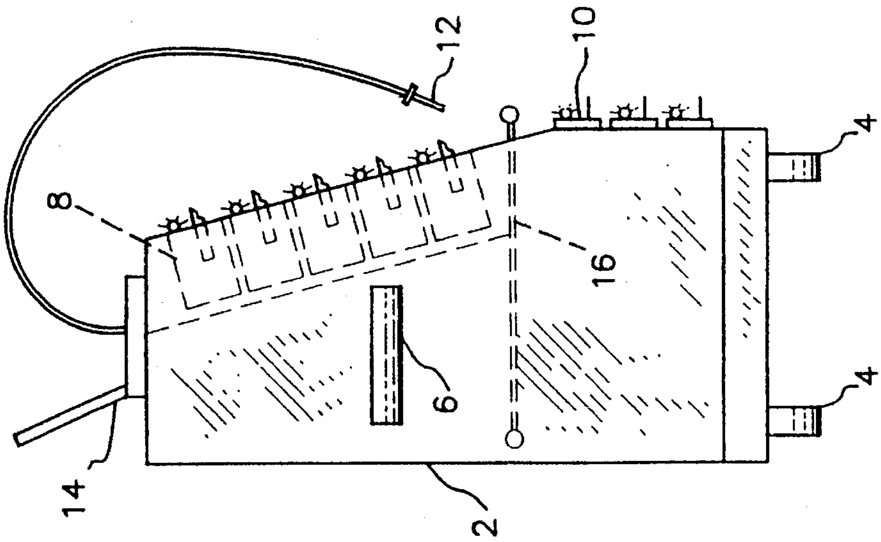
FIG. 1*b* illustrates a partial cross-sectional view of the same cart.
Figure 1A:
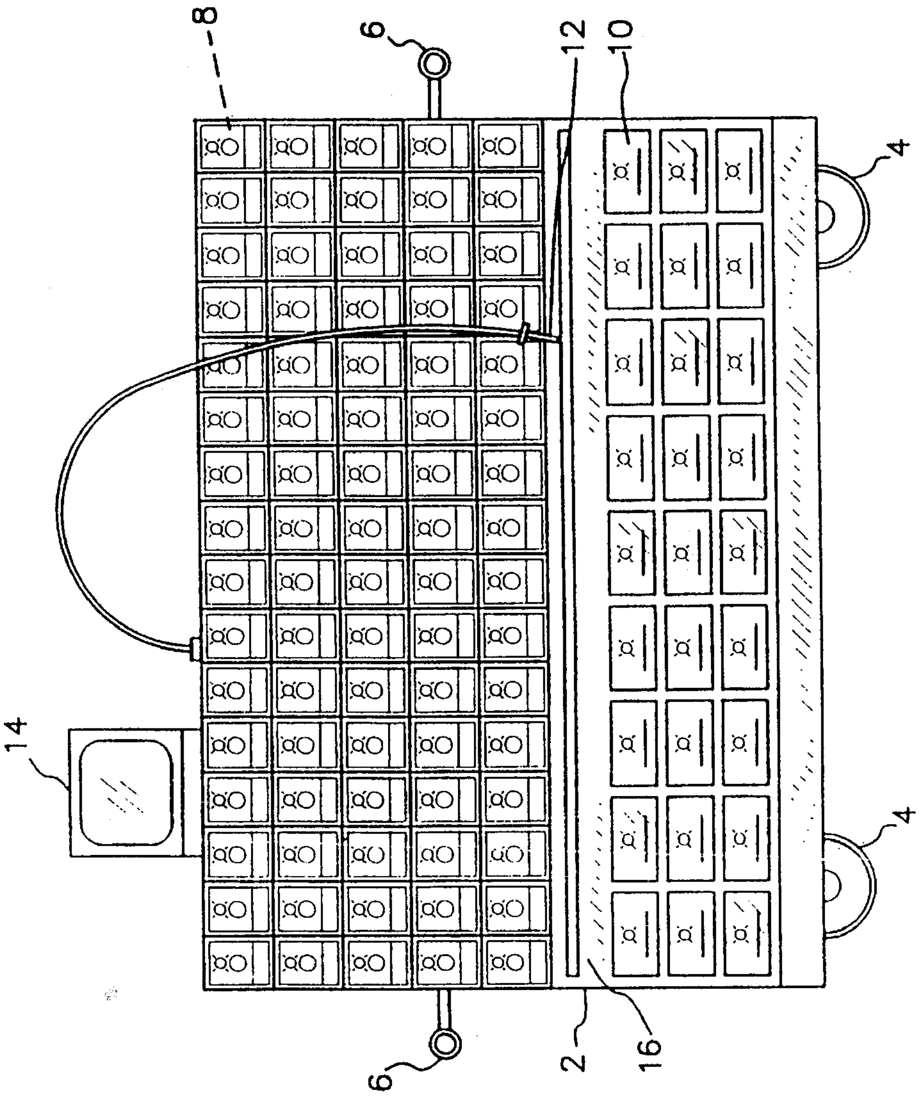
FIG. 1*a* illustrates a longitudinal view of a medication-dispensing cart in accordance with the present invention.
Figure 2:
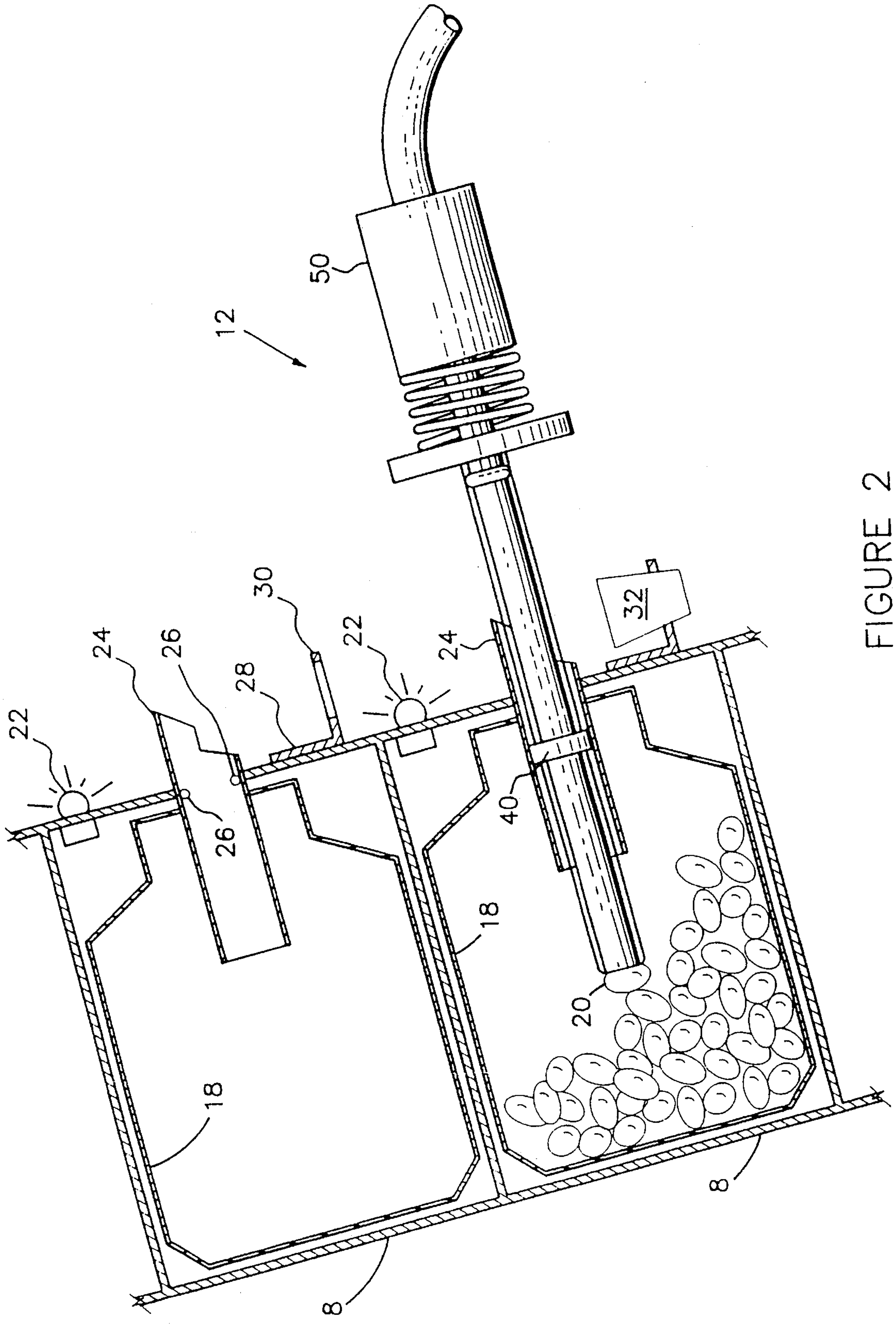
FIG. 2 illustrates a cross-section of two containers used in the cart.

One embodiment of the present invention is illustrated in FIGS. 1–3. FIG. 1*a* illustrates a longitudinal view of a medication-dispensing can in accordance with the present invention, and FIG. 1*b* illustrates a partial cross-sectional view of the same cart. The cart 2 preferably has optional wheels or casters 4, or other means of locomotion to make it mobile. Alternatively, the wheels could be omitted, and the cart could be stationary. Optional handles 6 on either end of the cart allow the cart to be maneuvered easily. There are a number of containers 8 and drawers 10 for holding medications. A suction tube 12 is used to withdraw pills and tablets from containers 8, as is explained further below.

A computer 14 is shown schematically. ("Computer" is used in the specification and the claims in a broad sense, and would include, for example, a microprocessor or a microcontroller, along with associated memory elements and input/output devices such as are known in the art of electronics today.) Not shown are various input/output devices and connections for the computer whose operation and construction will be understood by those of skill in the art in electronics after reading the present disclosure. Input/output devices for the computer may include, for example, a keyboard, trackball, and/or mouse used by the operator of the cart, a port for uploading/downloading data to or from another computer, a modem for uploading/downloading data to or from another computer via a telephone line, a monitor, a printer, and various input/output connections between the computer and the devices that it controls, such as the containers 8, drawers 10, and suction tube 12.

Metal lid 16 slides out of the way into cart 2, between containers 8 and drawers 10, when the cart is in use. When the cart is not in use, metal lid 16 may be slid forward, and swung on a hinge or pivot up and over containers 8. Lid 16 may then by physically locked over containers 8, in a configuration not illustrated, to prevent unauthorized access to the medications in the containers. (Drawers 10 are automatically locked by the computer at all times except when the computer specifically allows access.) Thus all medications contained in the cart are locked away to prevent unauthorized access when the cart is not in use. As a further precaution, it is preferred that the cart also be placed in a locked room when not in use. The cart may optionally be equipped with a motion sensor to sound an alarm if the cart is moved without an appropriate password first being entered into the computer. Note that closing lid 16 also has the benefit of inhibiting contamination of the drugs within the containers 8 by dust or the like.

FIG. 2 illustrates a cross-section of two containers 8. The upper container is shown empty except for medication jar 18, while the lower container contains tablets or capsules of medication 20 in jar 18. Suction tube 12 is shown entering the lower container to withdraw one or more tablets or capsules 20. Each container 8 is adapted to hold a bottle or jar 18 holding the capsules or tablets 20. Alternatively, there need be no bottle or jar, and the capsules or tablets may be placed directly in the container. Each container 8 has a signal light 22, which may for example be either red or green. The container has a plastic tube orifice 24 to allow entry and exit of suction tube 12; the tube orifice preferably has a lip on the upper surface as illustrated, to facilitate dropping an extracted pill into a paper cup as described below. The tube orifice also has a fiber optic or other sensor (such as a microswitch) 26 to indicate when an authorized or unauthorized entry is made into the container; in the case of an unauthorized entry, it may be desirable to have an alarm sound to indicate that a possible theft is in progress. The exterior of each container has a label holder 28 to identify the medication that it contains, and preferably has a platform 30 to hold a collection cup 32.

Figure 3A:
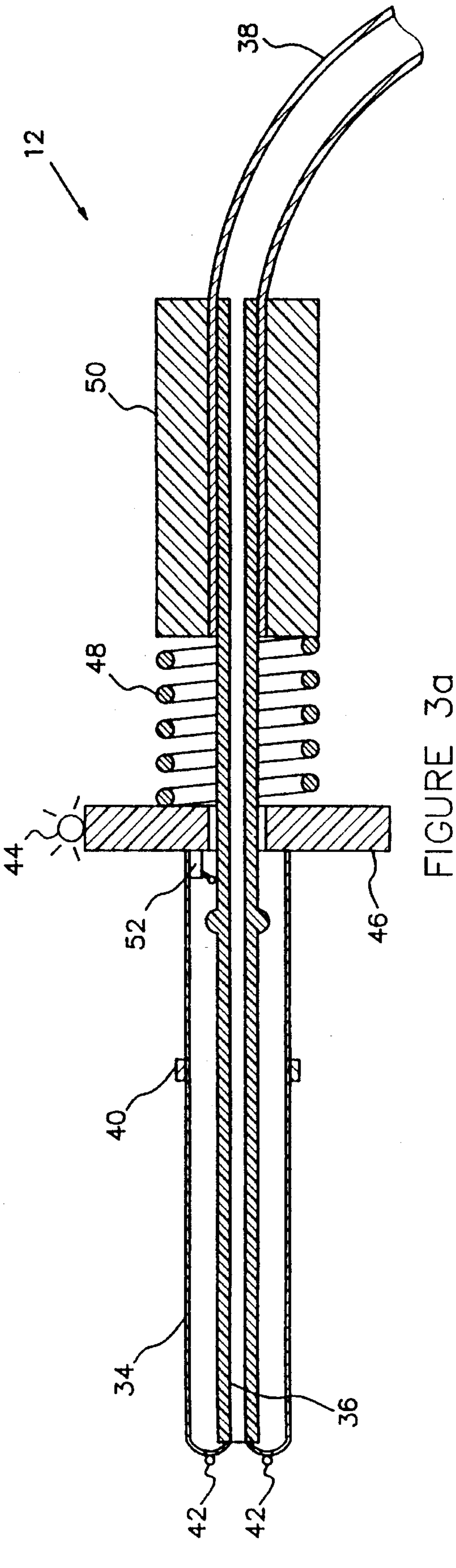
FIGS. 3*a* and 3*b* illustrate two positions of a suction tube that may be used in conjunction with this invention.
Figure 3B:
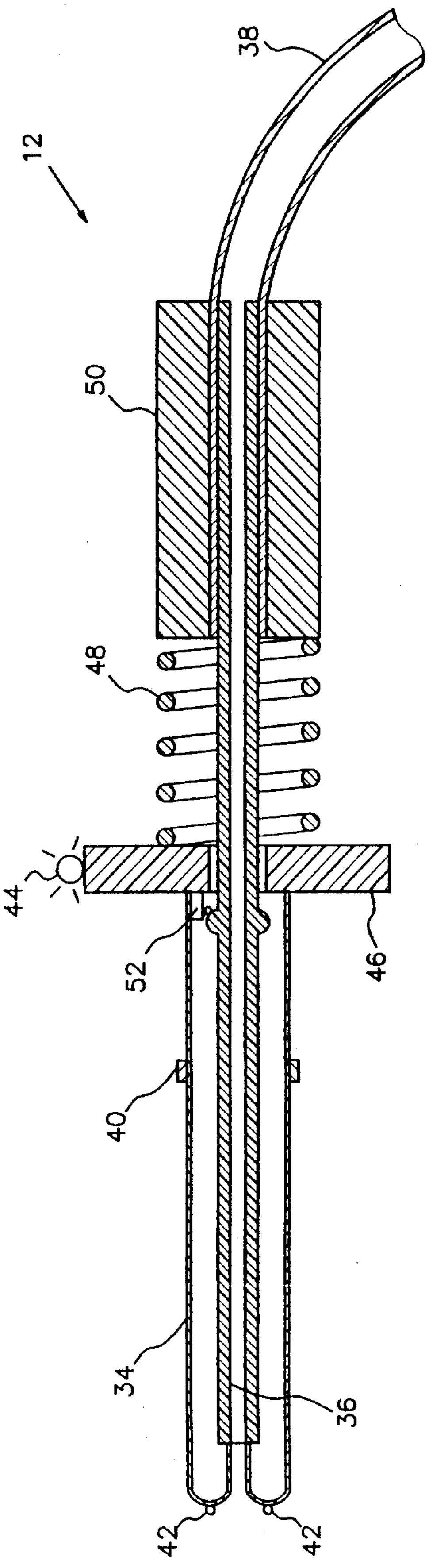

FIGS. 3*a* and 3*b* illustrate the suction tube 12 in greater detail. Am outer sheath 34 made of a flexible clear plastic covers part of the structure. Inner cylinder 36, which picks up a pill, is connected via rubber hose 38 to a suction motor (not shown) inside cart 2. Alternatively, the suction tube need not be connected to the cart as illustrated in FIG. 1*a*, but could instead be part of a portable unit containing a small vacuum motor in the handle. Several of such embodiments of suction tube 12 are described later herein. Glide collar 40 positions the inner cylinder in the tube orifice 24 when the inner cylinder is inserted in a container, and allows freedom of rotation to allow the inner cylinder 36 to find a pill within the container. The assembly allows fiber optic (or other) sensor 42 at the end of the sheath to be pushed over the end of inner cylinder 36 to confirm whether a tablet has been picked up; if so, a signal is sent to the computer indicating success, and causing indicator light 44 to turn on. Handle plate 46 is attached to sheath 34, and slides over inner cylinder 36. As depicted in FIG. 3*b*, pushing on handle plate 46 pushes the end of sheath 34 over the end of inner cylinder 36 to allow the fiber optic sensor 42 to function as described. Spring 48 between handle plate 46 and handle 50 urges the handle plate back to its starting position after such an inspection. Microswitch 52 detects when the end of sheath 34 is extended past the end of inner cylinder 36 in this manner, and microswitch 52 then activates fiber optic sensors 42.

Figure 4A:
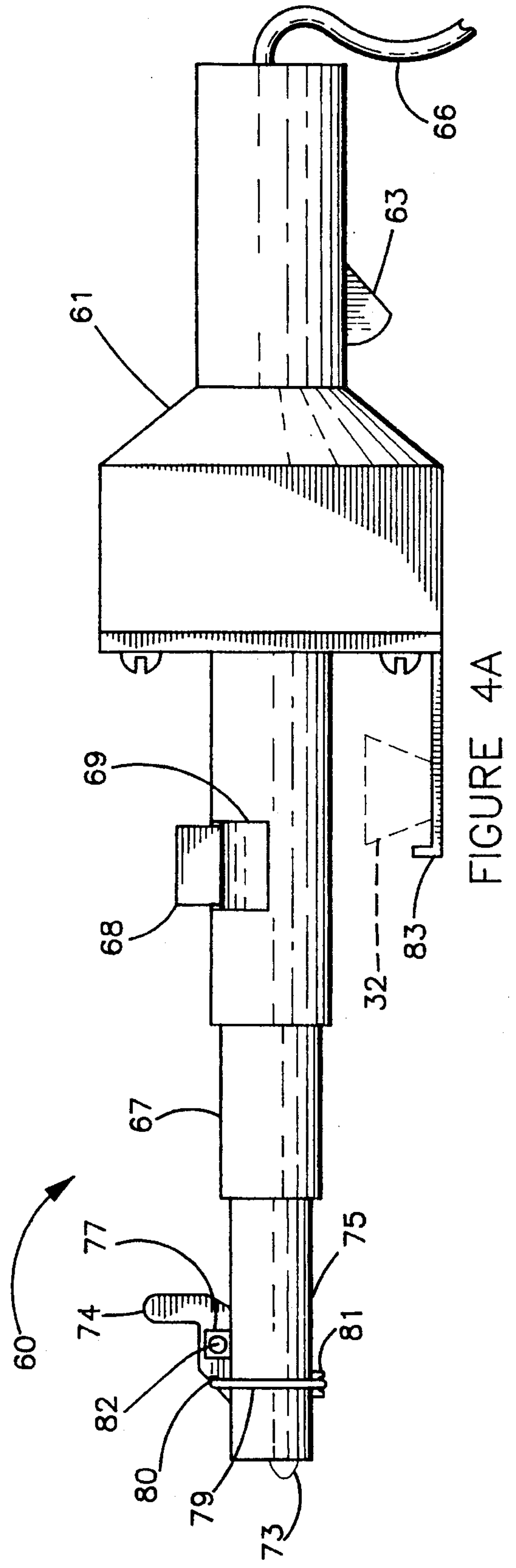
FIG. 4*a* illustrates an elevation view of a first alternate embodiment of a suction tube which can be used with the present invention.
Figure 4B:
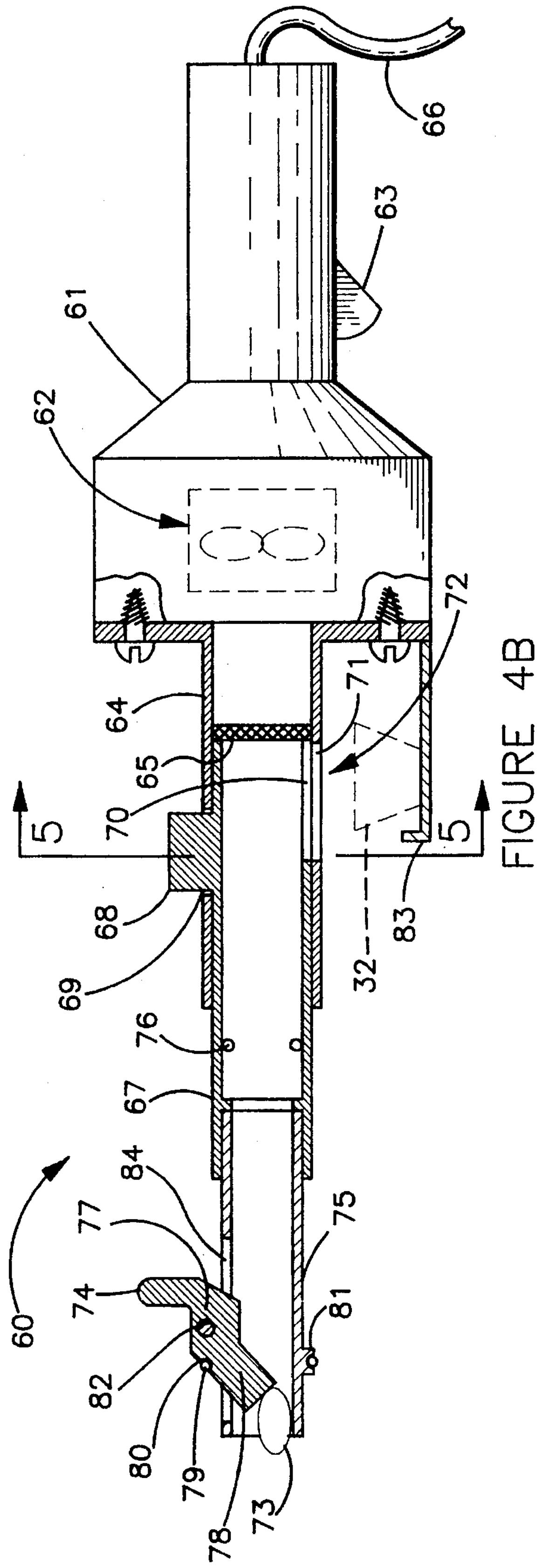
FIG. 4*b* illustrates a partial cross-sectional view of the embodiment in FIG. 4*a*.

An alternative embodiment 60 to suction tube 12 is shown in FIGS. 4*a* and 4*b*, comprising, in part, a handle 61 which houses a suction motor 62 manually controlled by an electrical switch 63. Power cord 66 extends from handle 61 and is connected between suction motor 62 and an external power source. Stationary tube 64 is attached to handle 61 by an air-tight seal (not shown), but is in fluid communication with suction motor 62 to allow suction to be created within stationary tube 64. Screen 65 is also attached inside stationary tube 64 and includes a mesh which is large enough to allow free flow of air through stationary tube 64, but small enough to prevent the passage of the smallest available pill 73 used in the medication administration system.

Figure 5B:
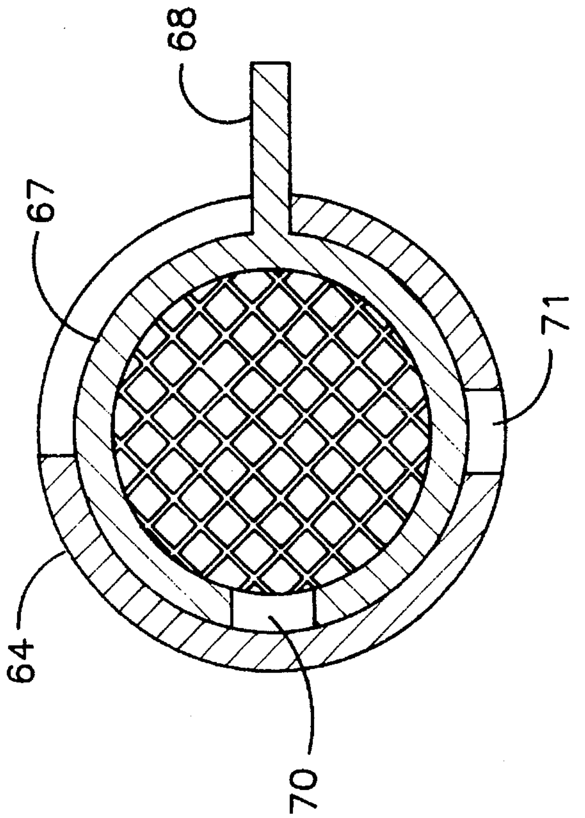
FIGS. 5*a* and 5*b* illustrate a sectional view of the adjustable outlet of FIG. 4*a* and 4*b* in two positions.
Figure 5A:
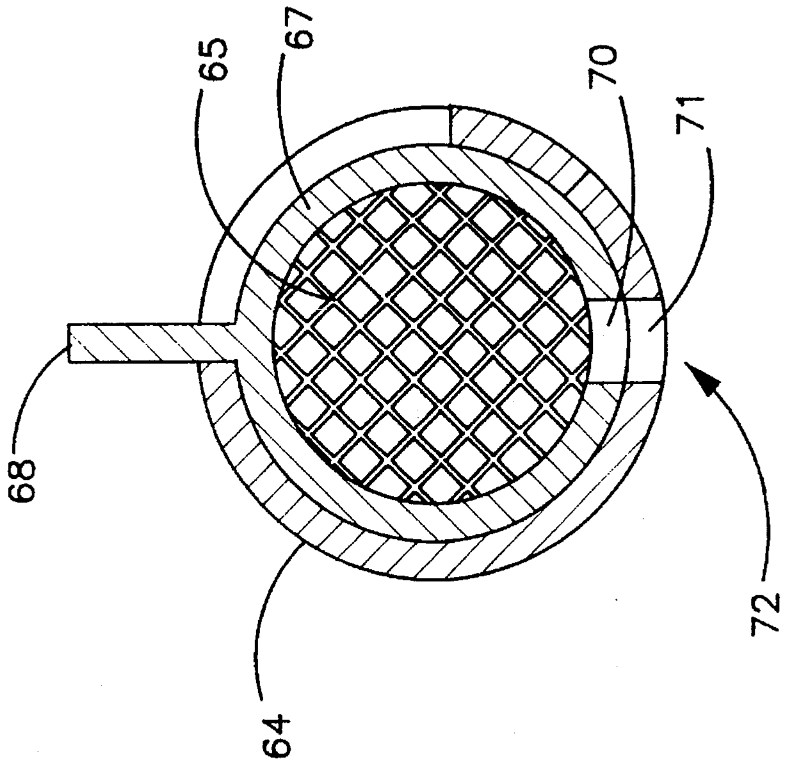

Inner tube 67 is rotatably disposed within stationary tube 64 and is held therein by tab 68 extending through an adjustment slot 69 formed in stationary tube 64. The relationship between tab 68 and adjustment slot 69 are such that inner tube 67 may be rotated by a force exerted on tab 68 in either direction. The extent of rotation of inner tube 67 is defined by the edges of adjustment slot 69, and is preferably about 60–90 degrees. Inner and outer pill slots 70,71 are also formed into inner tube 67 and stationary tube 64, respectively, to create a pill exit aperture 72 for allowing pills 73 to exit the suction tube 60 after being guided there by inner tube 67. Both inner and outer pill slots 70,71 may be identical in shape and size, and their alignment is controlled by the rotation of inner tube 67. For example, when tab 68 is in one limit position as shown in FIG. 5*a*, inner pill slot 70 and outer pill slot 71 may be aligned so that pill exit aperture 72 is completely open and large pills may exit suction tube 60. Likewise, in the opposite limit position of tab 68 as shown in FIG. 5*b*, inner pill slot 70 and outer pill slot 71 may be entirely offset so that pill exit aperture 72 is closed and no medication may exit from suction tube. In this manner. the size of pill exit aperture 72 may be controlled using intermediate positions of tab 68 so that varying size medication may be collected and dispensed. Optionally, inner tube 67 or stationary tube 64 may be inscribed or marked with gradations showing the percentage of opening or closing of pill exit aperture 72.

Similar in function to the sensors 42 in the previous suction tube embodiment in FIGS. 3A and 3B, infrared sensor 76, having an emitter and a detector, is located within inner tube 67 to sense the passage of a pill through inner tube 67, as shown in FIG. 4B. The passage of a pill 73 interrupts the detection of infrared energy from the emitter, and an audible or visual signal is generated by the computer. Once the signal is generated, the suction motor 62 may be deactivated as the tube 67 is rotated upward to allow pill 73 to reach pill exit aperture 72, to ensure that no further pills are retrieved.

Finally, collection tube 75 is either permanently attached to inner tube 67 or frictionally held in place within inner tube 67. Release lever 74 acts as a pill obstruction means and is rotatably mounted to a pin 82 across slot 84 and held within pivot base 77 on collection tube 75. Release lever 74 includes a lower portion 78 which obstructs the passage of pills 73 through collection tube 75, but which does not inhibit the flow of air therethrough. Resilient band 79, such as an O-ring or rubber band, is retained by notches 80,81 on both release lever 74 and collection tube 75, respectively, and urges lower portion 78 of release lever 74 into collection tube 75. The relative sizes of collection tube 75 inner diameter and lower portion 78 are such that the free flow of air through collection tube 75 is permitted. However, the initial obstruction created by lower portion 78 should be sufficient to prevent the passage of the smallest available pill 73 used in the medication administration system, and lower portion 78 should be close enough to the end of collection tube 75 so that only a single pill 73 is retained by the suction.

Importantly, the adjustment of pill exit aperture 72 can also be used to fine tune the suction motor 62 strength for certain medication. For instance, larger pills will typically require higher suction to keep the pills 73 within the end of the suction tube 60. Thus, the pill exit aperture 72 may be reduced or closed for larger pills to ensure their retrieval. Conversely for small pills, the pill exit aperture 72 may be increased (thus reducing suction strength) so that only one pill 73 is retained by the tip of suction tube 60 until the release lever 74 is depressed.

To collect pills 73 passing through suction tube 60, handle 61 further includes collection cup retaining means 83, such as a small bracket, which firmly holds collection cup 32 below pill exit aperture 72. Thus, any pills 73 passing through pill exit aperture 72 are conveniently caught within collection cup 32, after which collection cup 32 is presented to the patient for dispensing of the medication.

Figure 6A:
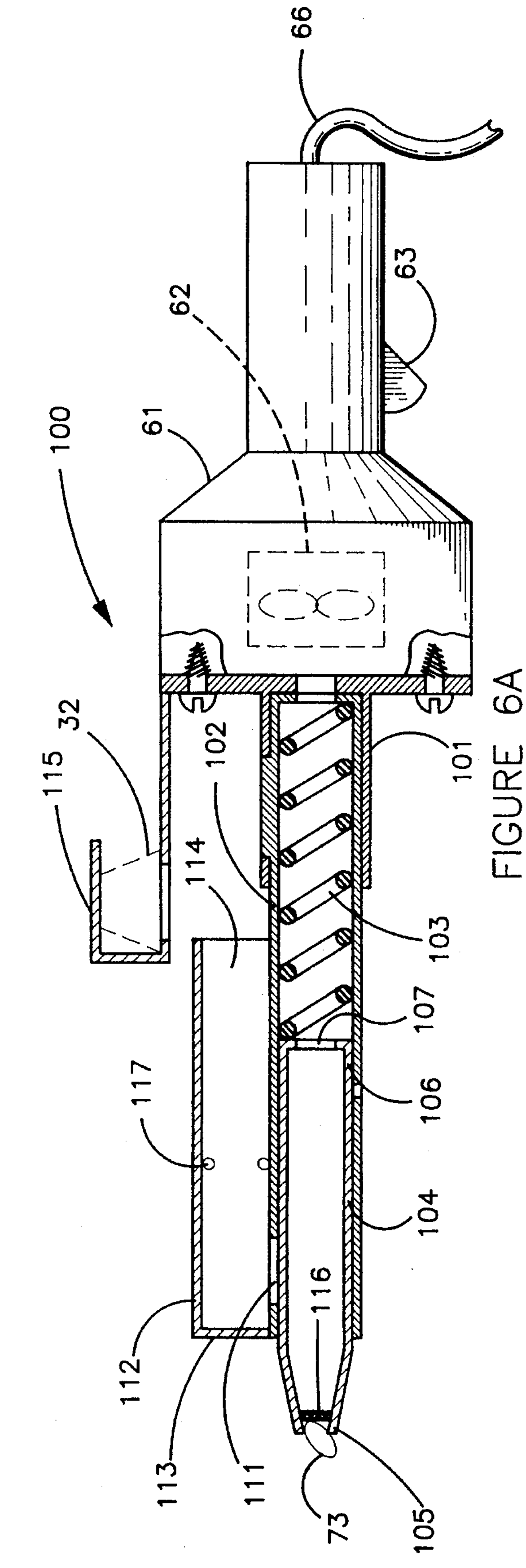
FIG. 6*a* illustrates a partial cross-sectional view of a second alternate embodiment of a suction tube in a receive position.
Figure 6B:
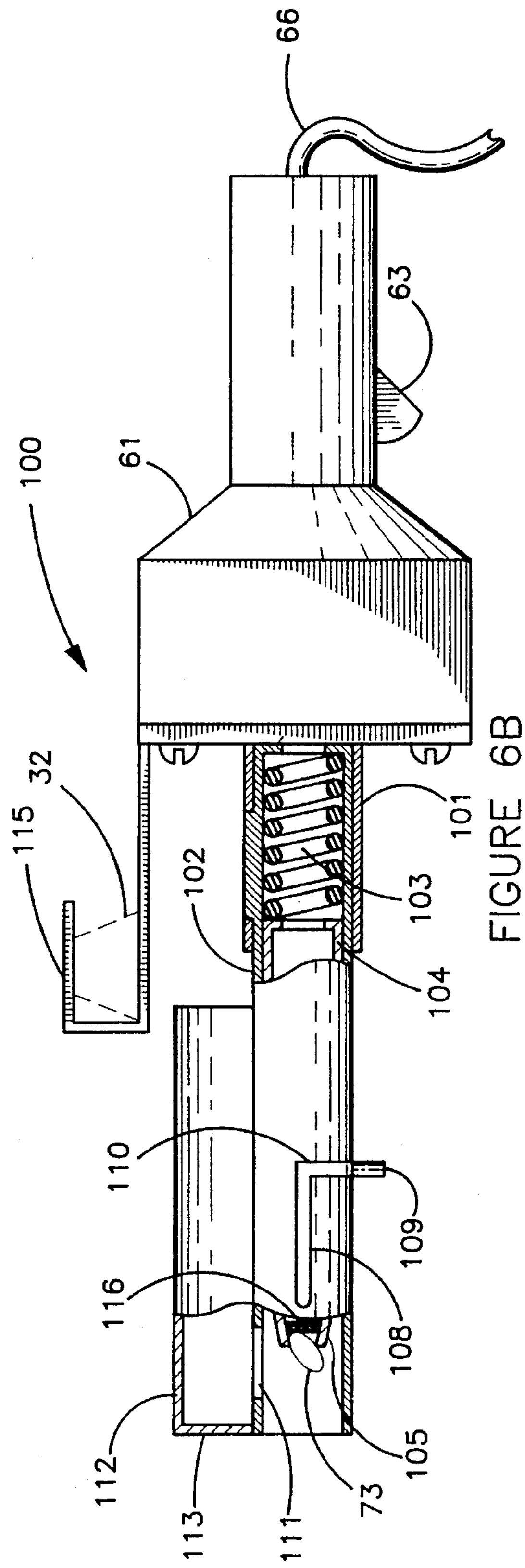
FIG. 6*b* illustrates the embodiment of FIG. 6*a* in a dispensing position.
Figure 7A:
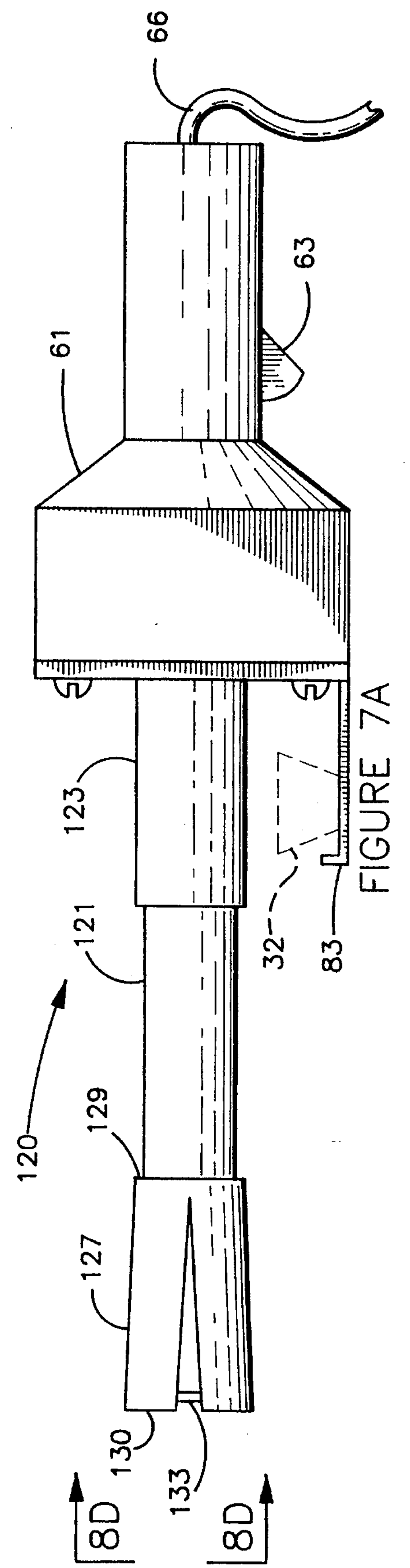
FIGS. 7*a* and 7*b* illustrate an elevation view of a third alternate embodiment of a suction tube with an adjustable aperture in a large and small open position, respectively.
Figure 7C:
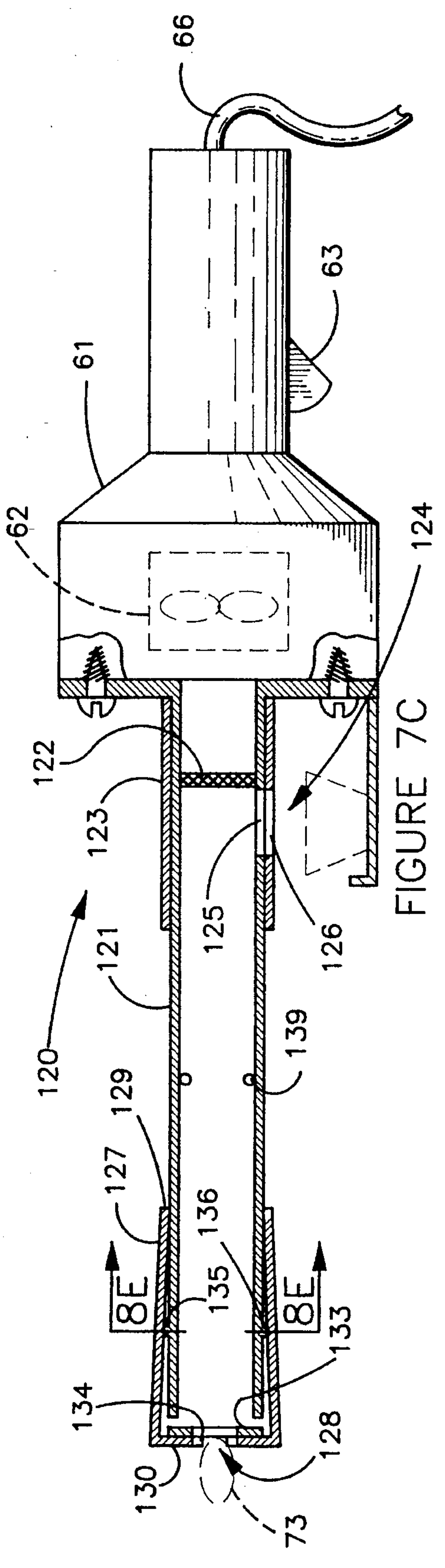
FIGS. 7*c* and 7*d* illustrate a partial cross-sectional view of the embodiment in FIGS. 7*a* and 7*b*, respectively.
Figure 7D:
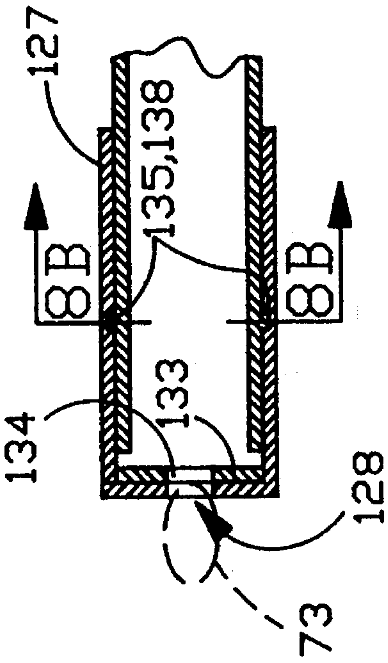
Figure 7B:
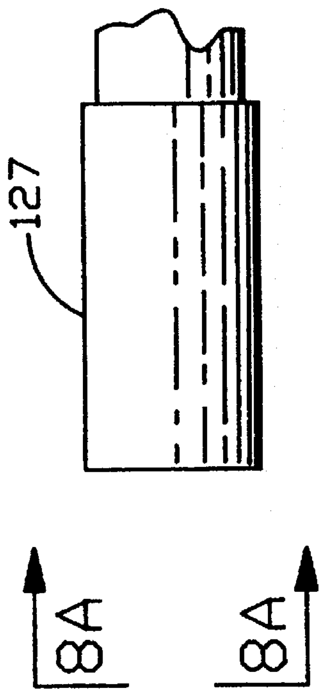

A second alternative embodiment 100 to suction tube 12 is shown in FIGS. 6*a* and 6*b*, comprising, in part, a handle 61, suction motor 62, electrical switch 63, and power cord 66 identical to the corresponding features in the embodiment of FIGS. 4*a* and 4*b*. First stationary tube 101 is attached to handle 61 by an air-tight seal (not shown), but is in fluid communication with suction motor 62 to allow suction to be created within first stationary tube 101. Second stationary tube 102 extends prominently from handle 61 and is either separately attached coaxially to first stationary tube 101 (as shown in FIGS. 6*a* and 6*b*) or formed as a part of first stationary tube 101. Helical compression spring 103 is seated within second stationary tube 102 and retained therein by abutment with collection tube 104.

Collection tube 104 includes an airflow inlet 105 and a base 106, through which is formed an airflow outlet 107. Inlet 105 further includes pill obstruction means 116, which prevents a pill 73 from passing through collection tube 104, but which does not inhibit the flow of air therethrough. Pill obstruction means 116 can take any number of forms, but is preferably a screen placed across the inner diameter of collection tube 104. Preferably, pill obstruction means 116 should be close enough to the inlet 105 of collection tube 104 so that only a single pill 73 is retained by the suction. Collection tube 104 is sized to slide freely within second stationary tube 102, and traverses between an extended position and a retracted position, both shown in FIGS. 6*a* and 6*b*, respectively.

The extended and retracted positions are defined by the interaction between a longitudinal slot 108 formed through second stationary tube 102 and a tab 109 attached to collection tube 104 which extends through longitudinal slot 108. The extended position of FIG. 6*a* simply results from the force applied by compression spring 103 against collection tube 104, and by the contact between tab 109 and the far end of slot 108. When extended, the inlet 105 of collection tube 104 protrudes sufficiently past second stationary tube 102 so that pill collection can be accomplished in the manner described below. The retracted position of FIG. 6*b* results from the manual compression of spring 103 by the user and the contact between tab 109 and a lock slot 110 formed as a part of longitudinal slot 108, but at least perpendicularly thereto. When locked into a retracted position, the inlet 105 of collection tube 104 becomes aligned with an exit port 111 formed into second stationary tube 102. Upon axial rotation of the suction tube 100 and cessation of the airflow therethrough, pill 73 is caused to drop into exit port 111 and travel through pill guiding means 112. Pill guiding means 112 includes a closed end 113 and an open end 114, wherein the open end 114 is aligned with a collection cup 32 seated in cup retaining means 115. Collection cup retaining means 115 is slightly different than that described earlier, because it must hold collection cup 32 in an inverted position prior to suction tube 100 being axially rotated to release pill 73. Preferably, an infrared sensor 117 as previously described herein is located within pill guiding means 112 to detect that a pill 73 has been received. Once the medication has fallen into collection cup 32, the medication can then be dispensed to the patient.

Finally, a third embodiment 120 of the suction tube 12 is depicted in FIGS. 7*a*–7*d* and FIGS. 8*a*–8*e*. As in the previous two embodiments, suction tube 120 includes, in part, a handle 61, suction motor 62, electrical switch 63, and power cord 66. Stationary tube 121 is attached to handle 61 by an air-tight seal (not shown), but is in fluid communication with suction motor 62 to allow suction to be created within stationary tube 121. Screen 122 is attached inside stationary tube 121 and includes a mesh which is large enough to allow free flow of air through stationary tube 121, but small enough to prevent the passage of the smallest available pill 73 used in the medication administration system. Collar 123 is slidably positioned in a concentric relationship to stationary tube 121 so that suction strength can be optionally adjusted and pills 73 can pass through pill exit aperture 124. Pill exit aperture 124 is similar to the corresponding feature seen in suction tube 100 of FIGS. 4*a* and 4*b* in that the alignment of inner and outer pill slots 125,126 formed in stationary tube 121 and collar 123, respectively, is controlled by the manual rotation of collar 123.

To control the size of pill to be collected by suction tube 120, adjustable sleeve 127 is rotatably and slidably mounted on the end of stationary tube 121. In its initial, or non-adjusted, position, adjustable sleeve 127 includes a pill inlet 128 which is sized to pick up the smallest pill administered by the medication dispensing system. In that position, the pill 73 is pulled against pill inlet 128 by the suction from stationary tube 121, but is prevented from traveling therethrough until the operator further opens the adjustable sleeve 127. When the adjustable sleeve 127 is opened near its maximum position, pill inlet 128 is sized to pick up the larger sized pills 73 in the same manner. Large pills are then collected by adjusting the sleeve 127 to its maximum open position. Thus, pill inlet 128 serves as an initial obstruction to the pill 73 prior to further adjustment which allows it to travel further into the suction tube 120. It will be understood that such adjustability is desirable, because the suction created through a pill inlet 128 of only one size may not be strong enough to hold the larger pills. Likewise, a single-size pill inlet 128 may cause inadvertent collection of more than one of the smaller sized pills. Adjustable sleeve 127 is cylindrically shaped and is constructed of a flexible material, such as plastic. Adjustable sleeve 127 has an open end 129 concentric with stationary tube 121, as well as a partially closed end 130, which includes pill inlet 128 described above. With specific reference to FIGS. 8*a* and 8*d*, partially closed end 130 includes matching end faces 131,132 through which pill inlet 128 is formed. Back plate 133 is attached to the reverse side of only one of either end face 131,132 and includes oval aperture 134. As will be clearer in the following explanation, the oval aperture 134 of back plate 133 is intended to maintain a uniformly adjustable pill inlet 128 during rotation of adjustable sleeve 127.

Figure 8A:
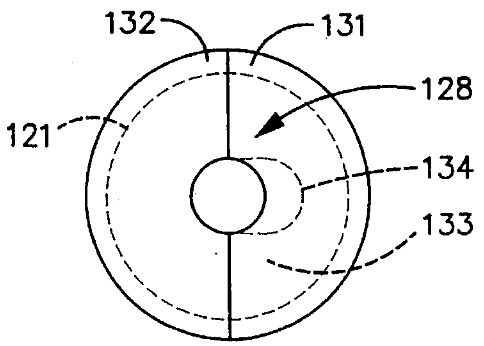
FIGS. 8*a* through 8*e* illustrate the adjustable inlet of FIGS. 7*a* through 7*d* in various positions.
Figure 8B:
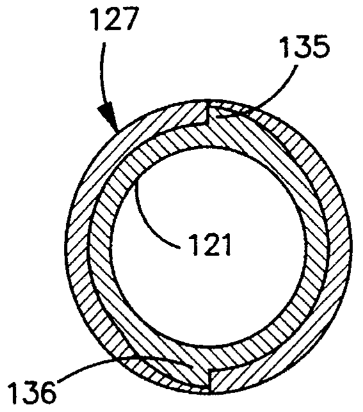
Figure 8C:
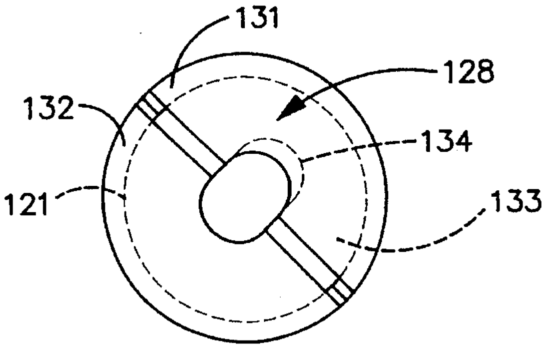
Figure 8D:
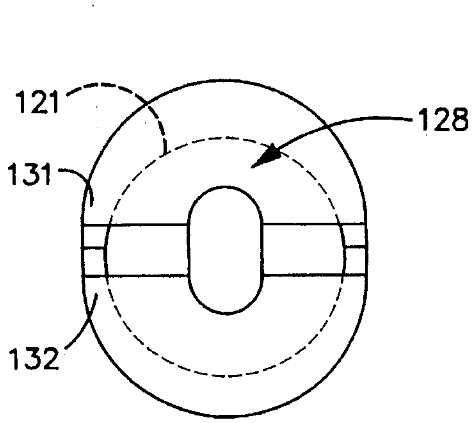
Figure 8E:
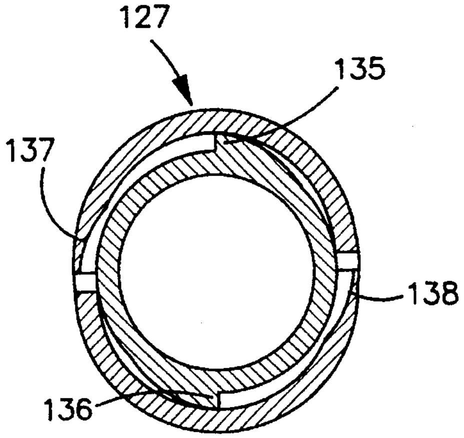

To enable its adjustability, adjustable sleeve 127 is split longitudinally along most of its length from partially closed end 130 to open end 129 and across its diameter. At least two diametrically opposing ramps 135,136 are formed circumferentially about stationary robe 121 and matingly correspond to an equal number of recesses 137,138 formed into the inside surface of adjustable sleeve 127. As can be seen by FIGS. 8*a* and 8*b*, ramps 135,136 and recesses 137,138 are sized and positioned with respect to pill inlet 128 such that pill inlet is smallest (and the split in adjustable sleeve 127 is closed) when ramps 135,136 and recesses 137,138 are in mating relationship. Conversely, as shown in FIGS. 8*d* and 8*e*, pill inlet 128 is open to its maximum size (and the split in adjustable sleeve 127 is open the widest) when ramps 135,136 and recesses 137,138 are about 90 degrees angularly spaced from one another after manual rotation of adjustable sleeve 127 by the user. FIG. 8*c* depicts an intermediate size of pill inlet 128 due to the rotation of adjustable sleeve 127 by about 45 degrees.

From the foregoing explanation, it can be seen that the ramps 135,136 act somewhat like cams with the inside surfaces and recesses 137,138 of adjustable sleeve 127 acting like followers. Because back plate 133 is attached to the reverse side of one of the two end faces 131,132, and as adjustable sleeve 127 is rotated from its initial position to its maximum open position, the shape of pill inlet 128 changes from a circle (in FIG. 8*a*) to a short oval (in FIG. 8*c*) and to a longer oval (in FIG. 8*d*). Thus, the user may adjust the size of pill inlet 128 to accommodate the size of pills 73 simply by rotating adjustable sleeve 127. Additionally, collar 123 may be rotated to change the size of pill exit aperture 124, which correspondingly adjusts the level of suction created at pill inlet 128. Once the desired pill 73 is retained within pill inlet 128, adjustable sleeve 127 is rotated to allow pill 73 to travel through stationary tube 121 (which acts as a pill guiding means) and past infrared sensor 139, which is identical to the sensors described earlier herein. After the pill 73 has been detected by sensor 139, pill exit aperture 124 is opened to a position which allows pill 73 to be collected by collection cup 32, which in turn is held by collection cup retaining means 83 also described elsewhere herein.

It should be noted that for the foregoing alternate embodiments of suction tube 12, it may be necessary to enlarge tube orifice 24 to accommodate the larger effective diameters of those suction tubes. However, the container 8 should otherwise remain unchanged. Also, because the above alternative embodiments to suction tube 12 contain the suction motor 62 within handle 61, additional adjustability can be achieved by an electrical switch (not shown) for controlling the speed of suction motor 62 if the need arises.

The typical operation of the invention will now be described. A nurse or other worker enters a password to be authorized to enter information, and after authorization inputs patient information and physician orders into the computer. This information may be updated as frequently as needed. The computer then compiles a list of the quantities of all needed medications for a selected period of time, which may for example be a day, a week, or a month.

A pharmacist reviews this list on a regular basis (e.g., daily, weekly), on an as-needed basis, or both, and loads the proper quantities of the indicated medications into the proper containers 8 or drawers 10. The pharmacist can simultaneously cause all containers 8 and drawers 10 to unlock by entering a password, using a mechanical key, or preferably both at the same time. Although a given medication will be located in a given compartment (or perhaps in more than one compartment if the demand for the medication is high), in many instances there will be no particular reason for segregating supplies of the same medication used by different patients. All patients taking a given drug can, in many cases, be supplied from the same container. The pharmacist confirms to the computer that each medication has been placed in the proper container or drawer, and locks the containers and drawers. The cart is then ready to be used to dispense medications to patients.

An alternative method for loading drugs into the cart is to keep the cart regularly supplied with a set of the most commonly used drugs in a particular facility, allowing the computer rather than the pharmacist to keep track of how much is dispensed to each patient (in accordance with physician orders, of course). Under this alternative, the commonly used drugs are re-stocked as their supplies get low, rather than when individual prescriptions are written. Less-commonly used drugs are still added to the cart individually by the pharmacist when prescribed by a physician.

When it is time for the medication cart to make a round, the individual responsible for dispensing the medications (usually a nurse) enters a password to be authorized to use the medication dispenser. The nurse then rolls the can to each patient, in any convenient order; the order in which the different patients' medications are dispensed makes no difference as the dispensing is under computer control. The nurse enters identifying information for a patient—the patient's name, identification number, thumbprint, etc. After the nurse verifies that the screen displayed by the computer in fact corresponds to the correct patient, the computer unlocks each container 8 or drawer 10 holding medication that the patient is scheduled to receive at that time. The signal light 22 for each such container or drawer changes from red to green, making it easy for the nurse to identify the proper compartments.

In the case of tablets or capsules held in one of the containers 8, and with specific reference to the suction tube 12 of FIGS. 3*a* and 3*b*, the nurse inserts suction tube 12 into the corresponding orifice tube 24. The sensor 26 activates the suction motor, and suction then causes the tube to pick up one pill at a time. (The inner diameter of inner cylinder 36 is preferably about 0.125 inch, smaller than the cross-section of nearly all pills used in prescription medications today, to minimize the likelihood that a pill will be sucked into the interior of the inner cylinder. Should a smaller pill size be encountered, the inner diameter could be made smaller; or an alternative method of inhibiting pills from being sucked into the inner cylinder is to place a small object, perhaps about the size and shape of a straight pin but with a blunt end, along the axis of the inner cylinder at the end that contacts the pills, to block pills from entering.) The nurse confirms that a pill has been successfully picked up by pushing slightly on handle plate 46, causing the end of sheath 34 to extend slightly over the end of inner cylinder 36, so that microswitch 52 activates sensors 42, and sensors 42 may detect the presence of a pill as previously described. The positive confirmation that a pill is being removed from the container allows the computer to keep accurate inventory of all the medications, reducing potential ambiguities in accounting that could be caused by the withdrawal of the tube without a pill. (Experience with a prototype embodiment of this invention has shown that a pill is successfully picked up by the tube on the first try about 90% of the time.)

Alternatively, sheath 34 could be eliminated, and the sensors 42 could be built into or onto the end of inner cylinder 36, so that the detection of a withdrawn pill is automatic, and does not require the extra step of pushing a sheath over the end of the inner cylinder.

When suction tube 12 is withdrawn from the orifice, the end of the tube may be wiped across the upper edge of orifice tube 24, causing the tablet or pill to fall into collection cup 32. The same cup may be used to collect all pills for the same patient.

For the suction tubes 60, 100, and 120, the procedure for gaining access to the necessary pills is the same, although the exact procedure for collecting and removing the pills is performed in accordance with the descriptions of those specific embodiments of the suction tube. However, regardless of which suction tube is employed, the pills need never touch human hands under the procedures outlined above.

In an alternative approach, lid 16 could be eliminated, along with that part of each tube orifice 26 that is interior to its corresponding container 8. A sliding metal panel (not illustrated) on the interior of container 8 closes and locks the opening of orifice tube into container 8 at all times except when access to the container is authorized by the computer. When access is authorized, the signal light 22 for that container changes from red to green, and a solenoid unlocks and opens the sliding metal panel to allow suction tube entry into container 8. After the suction tube is withdrawn, the sliding panel then closes and locks either automatically or manually, and a signal is given to the operator to proceed to the next authorized container 8, or to proceed to the next patient, or to end the round, as appropriate.

If a medication called for is not a tablet or capsule, then the indicator light over one of the drawers 10 will light, indicating the drawer holding the appropriate ointment, cream, liquid medication, suppository, vial, syringe, etc. The drawer is unlocked by the computer, allowing the nurse to withdraw the needed medication manually. After use, the medication is returned to the same drawer if it is susceptible of additional uses.

The dispensing nurse should preferably verify that there has been no mistake in the medication dispensed, to add a redundancy check to the system.

There are, of course, occasions when the cart should allow the dispensing nurse to request a medication that had not been scheduled in advance. For example, there might be such a request in the event of an emergency, if medication is dropped, or in the case of a PRN medication. In such a case, the computer may be allowed to dispense the requested medication, but only upon recording the time of the request, the name of the person authorizing the request, and a brief explanation of the reason for the request. The recordation of these deviations from the preauthorized medications allows necessary flexibility, while maintaining responsibility and accountability for the exceptions.

The computer records all medications dispensed: name and amount of medication, identity of patient, time dispensed, and name of nurse. Thus record keeping is greatly facilitated. This data may be downloaded into one or more facility computers after the completion of the round if desired.

As used in the claims, the term "pill" is intended to include any solid medication, other than a powder, that is taken orally, including pills, capsules, tablets, and the like. As used in the claims, pills are held "freely" in a compartment if they lie more-or-less loosely in the compartment itself, or if they lie more-or-less loosely inside a jar or bottle contained in the compartment, but are not further contained in additional packaging such as a blister pack or other packaging surrounding the individual pills.

All patents and patent applications cited in this specification are hereby incorporated by reference in their entirety. In the event of a conflict, however, the present specification takes precedence.

I claim:

1. A suction tube for use with a medication dispensing system, comprising:

(a) a handle which houses a suction motor powered by an external power source;

(b) a stationary tube attached to and extending from said handle in fluid communication with said suction motor;

(c) a second tube slidably attached to said stationary tube, said second tube having a distal end;

(d) pill obstruction means on said second tube for preventing a retrieved pill from traveling through said second tube;

(e) collection cup retaining means attached to said handle for holding a collection cup;

(f) pill guiding means positioned adjacent to said collection cup retaining means for guiding said retrieved pill to said collection cup; and (g) sensing means operatively disposed within said pill guiding means for detecting the passage of said retrieved pill through said pill guiding means.

2. The suction tube of claim 1, wherein said stationary tube includes an adjustable pill exit aperture alignable with said collection cup.

3. The suction tube of claim 1, wherein said stationary tube includes means for adjusting the airflow through said stationary tube created by said suction motor.

4. The suction tube of claim 1, wherein said pill obstruction means comprises a lever having a lower portion which extends into the distal end of said second tube, and wherein said lower portion is resiliently biased into said second tube.

5. The suction tube of claim 1, wherein said pill obstruction means comprises a screen attached within the distal end of said second tube.

6. The suction tube of claim 1, wherein said pill obstruction means comprises a sleeve slidably attached to the distal end of said second tube, wherein said sleeve includes an adjustable pill inlet.

7. The suction tube of claim 1, further including a screen within said stationary tube to prevent said retrieved pill from entering said suction motor.

8. The suction tube of claim 1, wherein said second tube is telescopingly slidable within said stationary tube, and said stationary tube further includes locking means operatively disposed between said stationary tube and said second tube for selectively locking the position of said second tube in either a retracted position or an extended position relative to said stationary tube.

9. The suction tube of claim 8, wherein:

(a) said pill guiding means comprises a guide tube mounted exterior to said stationary tube, and wherein a pill exit port is formed into said stationary tube leading into said guide tube; and (b) said distal end of said second tube is aligned with said pill exit port when said second tube is maintained in said retracted position.

10. The suction tube of claim 8, wherein said second tube is resiliently biased toward said extended position.

11. The suction tube of claim 1, wherein said sensing means comprises an infrared sensor having an emitter and a detector, and wherein the passage of said retrieved pill through said pill guiding means is detected upon obstruction of the energy from said emitter to said detector by said retrieved pill.

* * * * *